March 8, 1949.  C. F. VEENEMANS ET AL  2,463,727
PROCESS OF MANUFACTURING CATHODES
FOR ELECTRIC DISCHARGE TUBES
Filed Feb. 26, 1947
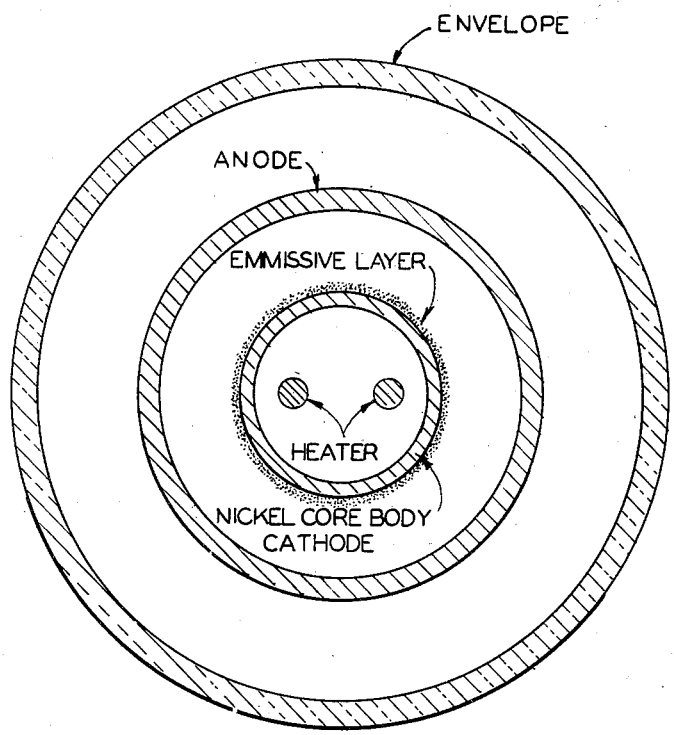
ROBERT LOOSJES & CORNELIS FREDERIK VEENEMANS
INVENTORS
BY
AGENT Patented Mar. 8, 1949

2,463,727

UNITED STATES PATENT OFFICE 2,463,727

PROCESS OF MANUFACTURING CATHODES FOR ELECTRIC DISCHARGE TUBES

Cornelis Frederik Veenemans and Robert Loosjes, Eindhoven, Netherlands, assignors to Hartford National Bank and Trust Company, Hartford, Conn., as trustee Application February 26, 1947, Serial No. 731,142
In Belgium December 12, 1944

Section 1, Public Law 690, August 8, 1946
Patent expires December 12, 1964

2 Claims. (Cl. 250—27.5)

This invention relates to a device for producing, amplifying or receiving electrical oscillations for short and very short waves, for instance waves shorter than 10 m., which device comprises an electrical discharge tube. Furthermore, the invention relates to a tube for use in such a device and to a method of making such tubes.

Various measures have already been proposed to match the properties of discharge tubes to the use for short and very short waves. Thus, it is known to make the distances between the various electrodes very small, and furthermore the attempts are directed to reducing the thickness of the emitting cathode layer to such a degree that the damping of the input circuit by the resistance of this layer is as small as possible. A difficulty in this case consists in the technical realisation of such a thin layer which must at the same time have a sufficient emission and a satisfactory life, since the layers concerned have a thickness of less than 10 microns.

Researches have shown that good results are obtainable by making use of a device for generating, amplifying or receiving electrical oscillations for short and very short waves according to the invention, which device comprises a discharge tube which contains a cathode having an electron-emitting layer which consists of one or more alkaline earth oxides obtained by precipitation of an alkaline earth metal from the vapour phase and oxidation thereof.

A device responding to short and very short waves, for instance waves shorter than 10 m. and even shorter than 1 m. are very favourably acted upon by the use of the cathode set out above, which is probably due to the fact that in this case there is a layer having a high electron-emitting capacity and the thickness of which mostly amounts only to 1 to $5\mu$; a layer having such a thickness, which has both a high electron-emitting capacity and a sufficient life is not obtainable in a reproducible manner by any of the other conventional methods. The way in which the desired alkaline earth metal vapour is produced may greatly vary. In one example of the method according to the invention use is made of one or more alkaline earth azides which are introduced into a discharge tube, decomposed by heating, whereupon the alkaline earth metal produced is vaporised, precipitated on a cathode core body and finally oxidised. This process is known per se and has, for instance, been described in regard to a barium oxide cathode in Dutch patent specification 19,245. Other methods that may be used are, for instance, the production of alkaline earth metal vapour from alloys such as barium-magnesium, barium-aluminium or the like, from reduction mixtures, e. g. barium oxide with magnesium, zirconium and so on, from copper or nickel tubes containing metallic barium or the like.

In the aforesaid Dutch patent specification 19,245 and also in other applications these common methods are described in regard to barium oxide cathodes, in which case the coating is consequently obtained by heating and decomposing a certain quantity of barium azide and vaporisation and precipitation of the barium formed. According to a particular executional example of the present invention the electron-emitting layer consists of a mixture of barium and strontium oxide obtained, for instance, from the mixed azides of these two alkaline earth metals; this mixture proves to have a much higher electron-emitting capacity than barium oxide alone, obtained by heating and decomposing the azide or obtained out of other compounds, alloys or mixtures. In this case the proportion barium oxide/strontium oxide is preferably between 50:50 percent by weight and 80:20 percent by weight. The researches which have led to the method according to which barium is precipitated from the vapour phase and which is described, for instance, in Dutch patent specification 19,245, took place twenty years ago. The method itself has become obsolete for some years past and replaced by the method of application called spraying-dipping, electrolysis, electrophoresis or the like. An important argument for abandoning those methods is that upon vaporising barium this vapour spreads throughout the tube and may involve undesirable emission phenomena and even shorts between the various electrodes and/or other electrically conductive parts. This drawback, which is opposed by important advantages in regard to the use of such a cathode in a device according to the invention, can be met by a special method of manufacturing a discharge tube according to the invention, according to which the cathode is made in a separate closed space, removed therefrom, exposed to the air for some time and subsequently built into the definitive tube, as set out in prior Dutch patent specification (Ph. 9,127). A device according to the present invention is particularly advantageous for the transmission of signals modulated as impulses having a variable time character on to a carrier wave. In fact, cathodes in a device according to the invention are very stable if, similarly as in these impulse modulation devices, they are heavily loaded periodically for a very short time. It has been found that specific loads of 1 A and higher per cm.$^2$ are permissible without involving drawbacks, for instance a short life or the like.

The application of the invention to the cathode of an electron discharge tube is illustrated in the accompanying drawing as being utilized in a diode structure, for simplicity of illustration.

The drawing represents a transverse section through a diode in which a cathode of this invention is employed.

It will be obvious that the cathode structure, as made in accordance with this invention, is equally applicable to tubes having one or more grids in addition to the cathode and the anode.

In order that the invention may be clearly understood and readily carried into effect it will now be set out more fully by giving an example in which is described the manufacture of a cathode for a device according to the invention. On a nickel core body is provided a thin layer of copper, which is superficially oxidised by heating in the air; in the vicinity of this core body is provided a pastil containing a mixture of barium azide and strontium azide about in the same proportion. This pastil, which may be secured to an electrode, is decomposed by high-frequency heating, after which barium and strontium are vaporised by further heating and precipitated on the oxidised core body. After that the cathode is heated for some time so that the alkaline earth metals precipitated are converted into oxide. The cathode is now coated with a layer of a mixture of barium- and strontium oxide having a thickness of about 1 $\mu$. After that the tube thus obtained is built into a device according to the present invention for producing or receiving electrical oscillations for short and very short waves, for instance less than 1 m.

What we claim is:

1. A device for producing, amplifying or receiving electrical oscillations for short and very short waves, for instance waves of the order of 1 m., which comprises an electric discharge tube having a cathode with a thin electron-emitting layer of alkaline earth oxides of the order of five microns formed by precipitation of alkaline earth metals from their vapour phase and subsequent oxidation thereof.

2. The process for manufacturing a cathode on a metal base of nickel oxide or copper oxide for an electric discharge tube which is to be suitable for use for receiving short and very short waves of the order of one meter, which process comprises disposing a cathode base in a vacuous space, heating a mixture of alkaline-earth compounds including barium and strontium compounds in that space to vaporize the barium and strontium and causing the precipitation of the barium and strontium metals onto the cathode base, heating the core thus formed to convert the barium and strontium to their oxides, then exposing that cathode element in an atmosphere of moist air to convert the oxides into the carbonates of barium and strontium, then incorporating the cathode as an electrode in its intended operating position in the envelope of a discharge tube and then heating the cathode to decompose the carbonates and form the oxides of the barium and strontium while evacuating the envelope.

CORNELIS FREDERIK VEENEMANS.
ROBERT LOOSJES.

REFERENCES CITED

The following references are of record in the file of this patent:

UNITED STATES PATENTS

| Number | Name | Date |
|---|---|---|
| 1,720,675 | Hertz | July 16, 1929 |
| 1,961,122 | Lowry | May 29, 1934 |
| 2,209,708 | Umbreit | July 30, 1940 |
| 2,317,754 | Gorlich | Apr. 27, 1943 |